United States Patent Office 3,324,084
Patented June 6, 1967

3,324,084
SULFO-SUBSTITUTED AROMATIC DICARBOXYL-
IC COMPOUNDS AND POLYESTERS THEREOF
Christian F. Horn, Stamford, Conn., and Harry Vineyard,
South Charleston, W. Va., assignors to Union Carbide
Corporation, a corporation of New York
No Drawing. Original application Sept. 18, 1962, Ser.
No. 224,553, now Patent No. 3,280,169, dated Oct. 18,
1966. Divided and this application May 23, 1966, Ser.
No. 551,921
10 Claims. (Cl. 260—75)

This application is a division of Ser. No. 224,553, filed on Sept. 18, 1962, now U.S. Patent No. 3,280,169, issued Oct. 18, 1966.

This invention relates in part to the production of novel sulfo-substituted aromatic dicarboxylic compounds, viz., bis[sulfo-9-(2-carboxyethyl)fluoren - 9 - yl]alkanes, their alkali metal sulfonate salts, and the alkyl carboxylate esters thereof. The invention is also concerned with novel condensation polymers i.e., polyesters containing, in polymerized form, minor amounts of the aforementioned sulfo-substituted aromatic dicarboxylic compounds, and evidencing an improved affinity for dyestuffs. In addition, the invention is concerned with textile articles, i.e., fibers, filaments, yarns, etc., as well as to films and other structures, produced from the aforementioned polymers, and which also evidence an improved affinity for dyestuffs.

More particularly, the novel sulfo-substituted aromatic dicarboxylic compounds of this invention can be represented by the formula

I

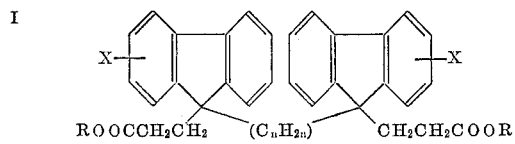

ROOCCH$_2$CH$_2$   (C$_n$H$_{2n}$)   CH$_2$CH$_2$COOR wherein X designates a sulfo (—SO$_3$H) or metallosulfo (—SO$_3$M) radical, M being an alkali metal atom, as for instance, a lithium, sodium, potassium, rubidium, or cesium atom, etc., and preferably an alkali metal atom having an atomic number of from 3 to 19, i.e., a lithium, sodium, or potassium atom; n designates an integer having a value of from 2 to about 10, and preferably from 2 to 6; and R designates a hydrogen atom or an alkyl radical containing from 1 to about 8 carbon atoms, such as a methyl, ethyl, propyl, butyl, hexyl, octyl, or 2-ethylhexyl radical etc., of which the lower alkyl radicals containing from 1 to 4 carbon atoms are preferred.

As illustrative of the novel sulfo-substituted aromatic dicarboxylic compounds of this invention, there can be mentioned:

1,2-bis[2-sulfo-9-(2-carboxyethyl)fluoren-9-yl]ethane,
1,2-bis[2-potassiumsulfo-9-(2-carboxyethyl)fluoren-9-yl]-
    ethane,
1,2-bis[2-sodiumosulfo-9-(2-carboxyethyl)fluoren-9-yl]-
    ethane,
1,4-bis[2-sulfo-9-(2-carboxyethyl)fluorene-9-yl]butane,
1,4-bis[2-lithiumsulfo-9-(2-carboxyethyl)fluoren-9-yl]-
    butane,
1,6-bis[2-sulfo-9-(2-carboxyethyl)fluoren-9-yl]hexane,
2-ethyl-1,6-bis[2-potassiumsulfo-9-(2-carboxyethyl)-
    fluoren-9-yl]hexane,
1,10-bis[2-sulfo-9-(2-carboxyethyl)fluoren-9-yl]decane,
1,10-bis[2-sodiumsulfo-9-(2-carboxyethyl)fluoren-9-yl]-
    decane,
1,2-bis[2-sulfo-9-(2-carbomethoxyethyl)fluoren-9-yl]-
    ethane,
1,2-bis[2-potassiumsulfo-9-(2-carbomethoxyethyl)fluoren-
    9-yl]ethane,
1,2-bis[2-sodiumsulfo-9-(2-carbomethoxyethyl)fluoren-
    9-yl]ethane,
1,4-bis[2-sulfo-9-(2-carbomethyoxyethyl)fluoren-9-yl]-
    butane,
1,4-bis[2-lithiumsulfo-9-(2-carbomethoxyethyl)fluoren-
    9-yl]butane,
1,6-bis[2-sulfo-9-(2-carbomethoxyethyl)fluoren-9-yl]-
    hexane,
2-ethyl-1,6-bis[2-potassiumsulfo-9-(2-carbomethoxyeth-
    yl))fluoren-9-yl]hexane,
1,10-bis[2-sulfo-9(2-carbomethoxyethyl)fluoren-9-yl]-
    decane,
1,10-bis[2-potassiumsulfo-9-(2-carbomethoxyethyl)-
    fluoren-9-yl]decane,
1,2-bis[2-sodiumsulfo-9-(2-carbobutoxyethyl)fluoren-9-
    yl]ethane,
1,2-bis[2-sulfo-9-(2-carbooctoxyethyl)fluoren-9-yl]-
    ethane,
1,2-bis[2-potassiumsulfo-9-(2-carbooctoxyethyl)fluoren-
    9-yl]ethane, and the like.

The sulfo-substituted aromatic dicarboxylic compounds of this invention can be obtained by various methods, which, it is to be noted, in no way limit the invention. Such compounds can, for example, be obtained by steps which include the sulfonation of a bis[9-(2-carboxyethyl)fluoren-9-yl]alkane or alkyl carboxylate ester thereof represented by the formula:

II

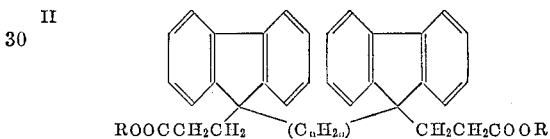

ROOCCH$_2$CH$_2$   (C$_n$H$_{2n}$)   CH$_2$CH$_2$COOR wherein n and R are as defined above.

As typical of such compounds, hereinafter referred to for convenience as "unsulfonated precursors," there can be mentioned:

1,2-bis[9-(2-carboxyethyl)fluoren-9-yl]ethane,
1,4-bis[9-(2-carboxyethyl)fluoren-9-yl]butane,
1,10-bis[9-(2-carboxyethyl)fluoren-9-yl]decane,
1,2-bis[9-(2-carbomethoxyethyl)fluoren-9-yl]ethane,
1,2-bis[9-(2-carbobutoxyethyl)fluoren-9-yl]ethane,
1,2-bis[9-(2-carbooctoxyethyl)fluoren-9-yl]ethane,
1,4-bis[9-(2-carbomethoxyethyl)fluoren-9-yl]butane,
1,10-bis[9-(2-carbomethoxyethyl)fluoren-9-yl]butane,
and the like.

The unsulfonated precursors hereinabove described can themselves initially be obtained, for example, by the reaction of fluorene with an alkylene glycol of the formula HO(C$_n$H$_{2n}$)OH, wherein n is as defined above, to yield a bis[fluoren-9-yl]alkane represented by the formula:

III

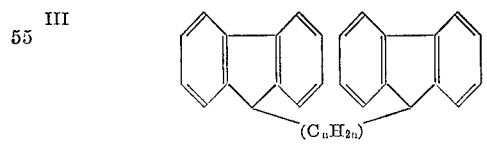

(C$_n$H$_{2n}$)

This bis[fluoro-9-yl]alkane can then be reacted with acrylonitrile followed by hydrolysis, to produce the unsulfonated precursors contemplated by this invention in free carboxylic acid form, i.e., wherein R defined above in connection with Formula II is hydrogen. The free carboxylic acid, in turn, is readily converted to the corresponding alkyl carboxylate ester by esterification in conventional manner with an alkyl alcohol containing from 1 to about 8, and preferably from 1 to 4 carbon atoms, such as methanol, ethanol, propanol, butanol, hexanol, 2-ethylhexanol, octanol, and the like.

The reaction of fluorene with an alkylene glycol (alkane diol) to produce the bis[fluoren-9-yl]alkanes represented above by Formula II is described, for instance, in the article by I. D. Rubin and E. I. Becker, entitled, "Alkylation of Fluorene with Alcohols and Their Alkoxides," JACS (1957), p. 1623–1625. Suitable glycols for use in this reaction include, for example, ethylene glycol, 3-propylene glycol, 1,4-butanediol, 1,6-hexanediol, 2-ethyl-1,6-hexanediol, 1,8-octanediol, 1,10-decanediol, and the like.

The glycol is generally employed in a ratio of about 0.1 to about 10 moles thereof per mole of fluorene, and is preferably employed in a ratio of about 0.2 to about 5 moles thereof per mole of fluorene. In addition, a catalytic amount of basic catalyst, such as an alkali metal hydroxide, oxide, or alkoxide, etc., is preferably incorporated in the reaction mixture. Good results can be obtained, for instance, using from about 0.1 to about 1 mole of catalyst, and preferably from about 0.2 to about 0.5 mole of catalyst, per mole of fluorene.

The reaction of fluorene with the glycol is generally carried out at a temperature of from about 175° C. to about 275° C. and preferably from about 220° C. to about 250° C., for a period of time sufficient to produce the desired bis[fluoren-9-yl]alkane product. Thereafter, the product can be recovered in any convenient manner. For instance, the product is readily recovered from the reaction mixture by slurrying the mixture with water to dissolve the glycol and, generally, the catalyst, and thereafter, filtering the aqueous slurry. If desired, the product can then be further purified by washing with water or methanol, or by recrystallization from an inert solvent, such as 1,4-dioxane, etc.

The subsequent reaction of bis[fluoren-9-yl]alkane with acrylonitrile produces the corresponding bis[9-(2-cyanoethyl)fluoren-9-yl]alkane, represented by the formula:

IV

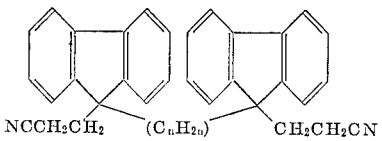

NCCH$_2$CH$_2$   (C$_n$H$_{2n}$)   CH$_2$CH$_2$CN wherein n is as defined below. The reaction is carried out by bringing the bis[fluoren-9-yl]alkane and acrylonitrile into reactive admixture at a temperature of from about 10° C. to about 50° C. and preferably from 20° C. to 35° C., in a ratio of from about 2 to about 5 moles or more of acrylonitrile per mole of the bis[9-fluorenyl]alkane. In addition, the reaction is preferably carried out in the presence of a catalytic amount of a basic catalyst such as an alkali metal hydroxide, oxide, or alkoxide, etc. Good results can be obtained, for instance, using from about 0.5 to about 10 percent by weight of the catalyst, and preferably from about 1 to about 5 percent by weight of the catalyst, based upon the weight of acrylonitrile. It is also preferred to incorporate an inert organic solvent for the bis[fluoren-9-yl]alkane in the reaction mixture. Suitable organic solvents include, for example, benzene, dioxane, pyridine, acetonitrile, tert-butyl alcohol, and the like.

A bis[9-(2-cyanoethyl)fluoren-9-yl]alkane is thereby generally formed as a water-insoluble solid which can be recovered from the reaction mixture by filtration. Additional product can also ordinarily be recovered when an organic solvent is employed by admixing the filtrate with water to precipitate the product. The product can then be further purified as described above.

The hydrolysis of the bis[9-(2-cyanoethyl)fluoren-9-yl]alkane to produce the corresponding bis[9-(2-carboxyethyl)fluoren-9-yl]alkane can be conducted by any method known to the art for the hydrolysis of a nitrile group. A particularly suitable method, for example, entails refluxing the bis[9-(2-cyanoethyl)fluoren-9-yl]alkane in admixture with water, acetic acid, and hydrobromic acid. In such a method it is preferred that at least four moles of water and at least two moles of hydrobromic acid be employed per mole of bis[9-(2-cyanoethyl)fluoren-9-yl]alkane charged.

Here again, the product is generally obtained as a water-insoluble solid, and can be recovered and purified as indicated above.

The conversion of the unsulfonated precursors represented above by Formula II to the corresponding sulfonic acid derivative, represented above by Formula I, wherein X designates the sulfo radical, can be carried out by known sulfonation procedures. Thus, for example, the unsulfonated precursor can be sulfonated by reaction with a mild sulfonating agent comprised of a mixture of sulfuric acid and acetic anhydride, at a temperature of from about −15° C. to about 50° C., and preferably from about 0° C. to about 25° C. The unsulfonated precursor, of which the free carboxylic acid form is preferably employed, is best introduced to the sulfonating agent in solution, using, by way of illustration, an inert solvent, such as methylene dichloride, ethylene dichloride, ethyl acetate, or the like. The mole ratio of sulfuric acid to acetic anhydride in the sulfonating agent can vary from about 0.1 to about 1 mole of sulfuric acid per mole of acetic anhydride, with a ratio of from about 0.2 to about 0.6 mole of sulfuric acid per mole of acetic anhydride being preferred. The mole ratio of sulfuric acid to the unsulfonated precursor can vary from about 2 to about 10 moles of sulfuric acid per mole of the unsulfonated precursor, with a ratio of from about 2 to about 3 moles of sulfuric acid per mole of the unsulfonated precursor being preferred.

The sulfonated product obtained in this manner is predominantly the bis(2-sulfofluorenyl) derivative. However, other sulfo derivatives may also be formed or can be obtained by varying the sulfonation reaction in a manner determinable by those skilled in the art in light of this disclosure.

Produced as hereinabove described, the sulfonated derivative can be recovered, if desired, in any convenient manner, such as by crystallization and filtration, etc.

When the starting material used in the sulfonation is the free acid, that is when R of formula II is hydrogen, the sulfonated derivative is readily converted to the corresponding alkyl carboxylate ester by esterification in conventional manner with an alkyl alcohol containing from 1 to about 8, and preferably from 1 to about 4 carbon atoms, such as those hereinabove described. The presence of the sulfo radical(s) during the esterification serves to catalyze the reaction (autocatalysis), thus obviating the conventional addition of an esterification catalyst.

The sulfonated derivative can thereafter be reacted with an alkali metal hydroxide or alkoxide, or an alkali metal salt of an acid weaker than sulfonic acid, such as acetic acid or benzoic acid, etc., to form the corresponding alkali metal sulfonate salt, i.e., metallosulfo derivative. Preferably, such a reaction is carried out in an alcoholic or aqueous solution, and at a temperature of from about 5° C. to about 110° C., and preferably from about 20° C. to about 80° C.

The mole ratio of alkali metal hydroxide, alkoxide, or salt to the sulfonated derivative can vary from about 2 to about 10 moles of the alkali metal-containing compound per mole of the sulfonated derivative, with a ratio of from about 2 to about 3 moles of the alkali metal-containing compound per mole of the sulfonated derivative being preferred. In this connection, the conversion of the sulfonated derivative to the alkali metal sulfonate salt can be effected conveniently by titration with an alkali metal hydroxide or alkoxide, preferably in alcoholic solution, to a pH of 7 to 8.

The alkali metal sulfonate thus produced can subsequently be recovered in any convenient manner, such as by filtration, or as the residue product obtained upon evaporation of any solvent present, etc.

The novel sulfo-substituted aromatic dicarboxylic compounds of this invention find use in a wide variety of applications. Such compounds can be used, for instance, as intermediates in the production of dyestuffs, pharmaceuticals, and ion exchange resins. In addition, the compounds are eminently suited for use as modifiers in the production of high-melting, crystalline, linear polyesters, especially polyesters formed by the polycondensation reaction of terephthalic acid, or ester-forming derivative thereof, with an aliphatic glycol, or ester-forming derivative thereof, and in connection with such use are hereinafter referred to for convenience as the modifiers of this invention. The modified polyesters prepared in part from the modifiers of this invention, and preferably from the alkali metal sulfonate derivatives, i.e., by the incorporation of such compounds in otherwise conventional polycondensation reaction mixtures, can, in turn, be employed to produce fibers which are readily dyeable with cationic and disperse dyestuffs by standard dyeing procedures. The dyed fibers thus obtained possess shades having good wash fastness and heat and light fastness, as well as stability to conventional dry cleaning procedures. The modified polyesters prepared in part from the modifiers of this invention can also be used to produce films and molded articles evidencing improved dyeability.

Synthetic linear polyesters are well known to the art and are readily prepared, for example, by the reaction of dibasic carboxylic acids, or their ester-forming derivatives, with dihydric alcohols, or their functional derivatives. The high-molecular weight linear polyesters thus obtained find frequent use in the production of textile articles, films, and the like. Of particular interest in this regard are the polyesters of terephthalic acid and its esters with aliphatic glycols, such as polyethylene terephthalate, and the polyester from dimethyl terephthalate and 1,4-cyclohexanedimethanol, etc. Unfortunately, the filamentous products produced from these polyesters have little affinity for dyestuffs by conventional dyeing procedures, and consequently, their utility in the fabric field is somewhat restricted.

It was to be expected that many efforts would be made to improve the dyeability of a film- and filament-forming material having as many desirable characteristics as those possessed by polyethylene terephthalate. Such efforts have indeed been made. However, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols, thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate unfortunately made it quite sensitive to air oxidation and to light. Another proposal involved the utilization of toxic carriers such as the chlorobenzenes, chlorophenols, and the like, for the dyeing process. Still another involved the application of vat or acetate dyes under superatmospheric pressure at temperatures above 100° C. Another required the use of fiber-swelling agents or dye carriers. Still another involved the use of pigments that are mixed directly with the polyethylene terephthalate melt before spinning.

It is apparent that these efforts have at best had very limited success. The methods involving chemical incorporation of modifying agents such as amino alcohols and polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially practicable.

These difficulties have now been overcome without impairing the characteristics of the polyester. Thus, for example, modified polyethylene terephthalate fibers and films made in accordance with this invention are readily dyeable by ordinary dyeing techniques, while at the same time retaining excellent heat and light stability, dimensional stability and other desirable properties.

The dyeable linear polyesters of this invention are prepared essentially from an aromatic dicarboxylic acid or ester forming derivative thereof, with a diol, such as an acyclic or alicyclic aliphatic glycol, and aliphatic-aromatic diol, an aromatic diol, or a diester thereof, and a small amount of at least one modifier of this invention.

Particularly suitable diols for use in preparing the dyeable linear polyesters of this invention are the acyclic and alicyclic aliphatic glycols containing from 2 to 10 carbon atoms, especially those represented by the general formula $HO(CH_2)_mOH$ wherein $m$ is an integer of from 2 to 10, such as ethylene glycol, trimethylene glycol, pentamethylene glycol, hexamethylene glycol decamethylene glycol, and the like. Other suitable aliphatic glycols include 1,4-cyclohexanedimethanol, p-xylene glycol, and the like. It is known that any glycol of an aliphatic nature, whether or not it contains aromatic nuclei, can be used in the production of linear polyester. Thus, the term aliphatic glycol as employed herein includes all those glycols of acyclic and alicyclic aliphatic nature which are known to the art to be suitable. Still other suitable diols include aliphatic-aromatic diols such as 4-hydroxybenzyl alcohol, aromatic diols such as hydroquinone, etc. Mixtures of two or more diols can also be employed, with up to about 10 mole percent or slightly more of any one diol being replaced by a different diol.

Particularly suitable aromatic dicarboxylic compounds for use in preparing the dyeable linear polyesters of this invention are the monocyclic aromatic dicarboxylic acids and the dialkyl esters thereof preferably containing from 1 to about 8 carbon atoms in each alkyl ester radical, especially terephthalic acid and the dialkyl esters thereof, such as dimethyl terephthalate and similar esters in which the alkyl ester radicals more preferably contain from 1 to about 4 carbon atoms. Other suitable aromatic dicarboxylic acids or esters include:

Isophthalic acid,
p,p'-diphenylcarboxylic acid,
p,p'-dicarboxydiphenyl ethane,
p,p'-dicarboxydiphenyl hexane,
p,p'-dicarboxydiphenyl sulfide,
p,p'-dicarboxydiphenyl sulfone,
p,p'-dicarboxydiphenyl ether,
p,p'-dicarboxyphenoxy ethane,
2,6-naphthalene dicarboxylic acid;

their alkyl esters; and the like. Mixtures of two or more dicarboxylic acids or esters can also be used, with up to about 10 mole percent or slightly more of any aromatic dicarboxylic acid or ester being replaced by a different aromatic dicarboxylic acid or ester, or by an aliphatic dicarboxylic acid or ester, such as adipic acid, succinic acid, sebacic acid, dimethyl sebacate, dimethyl 1,2-eicosane dioate, and the like.

Dyeable linear polyesters can also be prepared by the self-condensation of a hydroxycarboxylic acid or ester together with a modifier of this invention, or by the partial replacement of a diol or aromatic dicarboxylic acid or ester with a hydroxycarboxylic acid or ester within the limits hereinabove described.

In preparing the dyeable linear polyesters of this invention, at least about a 1.3 to 1 molar ratio of diol to dicarboxylic acid or ester is used. However, an excess of diol to the dicarboxylic compound ranging from about 2 to 10 moles of diol per mole of the dicarboxylic compound can also be used. A more satisfactory ratio is from about 1.3 to about 7 moles of diol per mole of the dicarboxylic compound, with a ratio of from about 1.5 to about 5 moles of diol per mole of the dicarboxylic compound being especially preferred.

The amount in which the modifiers of this invention are employed in preparing the dyeable linear polyesters can be varied from about 0.1 to about 10 mole percent of the modifier based upon the total amount of other dicarboxylic acid compounds charged, i.e., as the free acid or as the ester. A preferred ratio is from about 0.15 to about 4 mole percent of the modifier based upon the total amount of other dicarboxylic acid compounds charged.

A monofunctional molecular weight regulator such as those described in British Patent 838,663 can also be employed in an amount varying generally from about 0.1 to about 3.5 mole percent of the molecular weight regulator based upon the total amount of dicarboxylic compounds charged. A preferred ratio is from about 0.15 to about 2.5 mole percent of the molecular weight regulator based upon the total amount of dicarboxylic compounds charged.

In preparing the dyeable linear polyesters of this invention, the prescribed amounts of diol, dicarboxylic acid compound, including the modifier of this invention, and catalyst when desired, are charged to a reactor. When a dicarboxylic acid ester is employed as a reactant, the reaction mixture is heated at a temperature of from about 150° C. to about 270° C., and preferably from about 170° C. to about 260° C., in an inert atmosphere to effect an initial ester interchange reaction. Alternatively, an initial direct esterification can be carried out by employing the free dicarboxylic acid instead of the ester as a reactant. Thereafter, any excess glycol is removed by heating the reaction mixture to a temperature of up to about 300° C., under reduced pressure in an inert atmosphere, or by passing a stream of an inert gas through the reaction mixture at atmospheric pressure. A polycondensation is then carried out by heating the reaction mixture at a temperature of from about 225° C. to about 325° C., and preferably from about 250° C. to about 290° C., under a reduced pressure of from about 0.1 mm. to about 5 mm. of mercury, in an inert atmosphere. If desired, the entire reaction can be carried out at atmospheric pressure while bubbling a stream of inert gas through the reaction mixture, the rate of gas flow being increased as the polycondensation proceeds. The total reaction period can be from about one to twelve hours, according to the catalyst employed and its concentration, the temperature, the pressure, the starting monomers, the viscosity desired for the polyester product, etc., as is known to the art.

The monomers are preferably reacted in contact with a suitable catalyst in order to shorten the reaction period and thus lessen the possibility of discoloration. Any of the well known polyesterification catalysts can be used, such as antimony oxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanate, calcium titanium silicate, and the like. Other conventional catalysts can also be employed. The concentration of the catalyst can be varied from about 0.001 to about 1 percent by weight, based upon the total amount of dicarboxylic acid compounds charged. A preferred amount is from about 0.005 to about 0.5 percent by weight of catalyst, and more preferably from about 0.01 to about 0.2 percent by weight of catalyst, based upon the total amount of dicarboxylic acid compounds charged. Other materials can also be included in the reaction mixture, as for example, color inhibitors such as alkyl or aryl phosphites; pigments, delusterants or other additives, such as titanium dioxide or barium carbonate; or viscosity stabilizers, etc.

A typical procedure for producing the polyester is described, for example, in U.S. 2,465,319, although this procedure can be varied by one skilled in the art in light of this disclosure.

That the modifiers of this invention could be employed in the production of high-melting, crystalline, linear polyesters was surprsing and unexpected since fluorene, the basic structure of the modifiers, ordinarily discolors and/ or decomposes when heated to the temperatures employed in making the polyesters. Thus, it was unexpected that the modifiers would be sufficiently stable, both chemically and thermally, to withstand the polycondensation conditions in the presence of the other reactants, as well as the high temperatures necessary for spinning the polyesters. It was also surprising that the fibers produced from these polyesters showed no disadvantages in physical properties over the unmodified polyester fibers, and that they exhibited greatly enhanced dyeability, as well as many other desirable textile properties. By way of illustration, such fibers are also often desirably delustered or "whitened," show improved moisture regain and resistance to both pilling and the accumulation of static charge, and upon dyeing with basic or disperse dyestuffs by standard procedures, possess medium to deep shades of color having good wash fastness and light fastness, as well as stability to conventional dry-cleaning operations. Fabrics produced from the fibers are also characterized by a desirable "hand," and "wash-and-wear" properties.

The specific examples which follow serve as further illustration of the present invention. In the examples, the reduced viscosity, $(I_R)$, of the dyeable linear polyesters of this invention is determined by dividing the specific viscosity of a solution of the polyester by the concentration of the polyester in the solution. The specific viscosity is determined by dividing the difference between the viscosity of the polyester solution and the viscosity of the solvent by the viscosity of the solvent. In particular, the reduced viscosity of the polyesters is calculated from the equation:

(IV) $$I_R = \frac{\Delta N}{N_o} \times \frac{1}{C}$$

wherein $\Delta N$ is the difference between the flow time of the polyester solution and the flow time of solvent, $N_o$ is the flow time of the solvent, and $C$ is the concentration of the polyester in grams per 100 milliliters of solution. The reduced viscosities are obtained at a polyester concentration of 0.2 gram per 100 milliliters of solution, using a 3:2 mixture of phenol and tetrachloroethane as the solvent. The reduced viscosity of the polyesters can vary from about 0.2 to about 3, with values from about 0.35 to about 1 being preferred.

The dyeable linear polyesters of this invention can be melt-spun to form filaments and yarns. In a typical operation, before melt-spinning, the polyesters are dried overnight at a temperature of 90° C. under a reduced pressure of 2 mm. of mercury, and then melt-extruded in a plunger-type spinning machine at a temperature of from 270° C. to 295° C., using a spinnerette having 30 holes, each 0.015 inch in diameter. The orifice velocity is 3 feet per minute and the yarn is taken up at 150 feet per minute, a draw ratio of 50:1. The yarn is hot-stretched at a temperature of 90° C. around an electrically heated pin to an extent of from 200 to 500 percent, and then continuously annealed at a temperature of 150° C. over an electrically heated bar, allowing 10 percent relaxation. The yarn is thereafter woven into fabrics and dyed. The spinning procedure is conventional for polyesters, and is well known to the art.

The fabrics are dyed by standard procedures both in the absence of, and using dye-carriers. The dye baths have liquor-to-fiber bath ratio of 40:1 and, based upon the weight of the fabric to be dyed, contain 1 percent by weight of nonyl phenyl polyethylene glycol ether in the case of a basic dyebath, and 1 percent by weight of sodium N-methyl-N-oleoyltaurate in the case of a disperse dyebath. The dye concentration is 3 percent by weight based upon the weight of the fabric.

In a typical dyeing procedure, the various components of the dyebath are admixed and made up to volume with distilled water. The dyestuff is introduced as a paste in 0.25 percent by weight of acetic acid, based upon the weight of the fabric to be dyed. The fabric is scoured in a commercially available washer and dried in a commercially available drier. About 5 to 10 grams of the fabric is added to the dyebath, and the temperature of the bath is raised to the boil over a period of 15 minutes, and held at the boil for an additional period of 90 minutes. The dyed fabric is then rinsed in warm water and scoured in an aqueous solution containing 1 percent by weight of a commercially avialable alkyl phenyl polyethylene glycol ether surfactant and 0.25 percent by weight of soda ash, based upon the weight of the fabric, at a temperature of 60° C. for a period of 15 minutes. The dyed and scoured fabric is finally rinsed in water and air dried.

Among the basic and disperse dyestuffs which readily dye the fibers produced from the polyesters of this invention, one can mention the "Genacryl" dyes discussed on pages 432 to 433 of the American Dyestuff Reporter, volume 43, 1954, for example, Genacryl Red 6B (Basic Violet 7, Color Index No. 48020); Genacryl Pink G (Basic Blue 1, Color Index No. 42025); Celliton Fast Red GGA Ex. Conc. (Disperse Red 17, Color Index No. 11210); Fuchsine SPC (Basic Red 9, Color Index No. 42500); Fuchsine Conc. (Basic Violet 14, Color Index No. 42510); Methyl Violet 2B (Basic Violet 1, Color Index No. 42535); Methylene Blue SP (Basic Blue 9, Color Index No. 52015); Victoria Green (Basic Green 4, Color Index No. 4200); Rhodamine B (Basic Violet 10, Color Index No. 45170); Sevron Yellow R (Basic Yellow 11, Color Index No. 48055); Celliton Fast Pink BA (Disperse Red 15, Color Index No. 60710); Latyl Blue FL; Maxilon Red BL; Sevron Brilliant Red 4G (Basic Red 14); Sevron Blue 5G (Basic Blue, Color Index 51004); and the like.

*Example I*

A rocker autoclave is charged with 332 grams of 95 percent fluorene, 500 grams of ethylene glycol, and 100 grams of 85 percent potassium hydroxide. The autoclave is sealed, pressured to 25 p.s.i.g. with air, and heated to 220° C. for 20 hours, accompanied by agitation. The contents of the autoclave are then removed, slurried with one liter of water, filtered, and the filtered product is washed consecutively with water and methanol and dried. In this manner, 157 grams of 1,2-bis[fluoren-9-yl]-ethane, having a melting point of 228–229.5° C. are obtained.

To a charge containing 36 grams of 1,2-bis[fluoren-9-yl]ethane, 750 milliliters of dioxane, and 10 milliliters of a 32 percent solution of benzyltrimethylammonium hydroxide in methanol, 20 grams of acrylonitrile are slowly added, accompanied by stirring at a temperature in the range of from 27° to 37° C. The reaction is then cooled to 29° C. and maintained there for 2 hours, after which an additional 10 milliliters of the methanolic benzyltrimethylammonium hydroxide solution and 20 grams of acrylontrile are added. The reaction mixture is then filtered, and upon recrystallization of the filtered product from dioxane, 26 grams of 1,2 - bis[9-(2-cyano-ethyl)-fluoren-9-yl]ethane, having a melting point of 275°–277° C. are obtained.

*Analysis.*—For $C_{34}H_{28}N_2$—Calculated: C, 89.94%; H, 6.03%; N, 6.03%. Found: C, 89.95%; H, 6.10%; N, 6.20%.

A mixture of 300 grams of 1,2-bis[9-(2-cyanoethyl)-fluoren-9-yl]ethane, 750 grams of 48 percent aqueous hydrobromic acid and 750 grams of glacial acetic acid, charged to a flask, is refluxed vigorously for 4 days. Upon filtration, washing the filtered product with water, and recrystallizing the product from dioxane, 277 grams of 1,2-bis[9-(2-carboxyethyl)-fluoren-9-yl]ethane, having a melting point of 285–287° C., are obtained.

*Analysis.*—For $C_{34}H_{30}O_4$—Calculated: C, 81.27%; H, 5.98%. Found: C, 81.02%; H, 6.09%.

To 750 milliliters of methanol, there are added 75 grams of 1,2-bis[9-(2-carboxyethyl)fluoren-9-yl]ethane and 1 gram of para-toluene sulfonic acid. The resulting mixture is refluxed for 20 minutes, whereupon a precipitate is formed. An additional liter of methanol is then added to the reaction mixture, followed by reflux for 12 hours. Upon cooling, filtration, and recrystallizing the filtered product twice from acetonitrile, 66 grams of 1,2-bis[9-(2-carbomethoxyethyl)-fluoren-9-yl]ethane, having a melting point of 174°–175° C., are obtained.

*Analysis.*—For $C_{36}H_{34}O_4$—Calculated: C, 81.48%; H, 6.47%. Found: C, 80.71%; H, 6.41%.

To 56 grams of acetic anhydride, cooled to 0° C., 27 grams of sulfuric acid are added dropwise, accompanied by stirring and continued cooling, so that the temperature of the resulting solution is maintained at 0° C. To this solution, there is slowly added a solution containing 66 grams of 1,2-bis[9-(2-carbomethoxyethyl)fluoren-9-yl] ethane dissolved in 600 milliliters of ethylene dichloride. A precipitate is formed during the addition. The resulting mixture is then stirred at a temperature in the range of from 0.° C. to 5° C. for a period of 3 hours, followed by warming to 10° C. over a period of 1 hour to effect a solution. Thereafter the solution is warmed to 45° C. over a period of 2.5 hours, and maintained at 45° C. for an additional period of 1 hour. The solution is finally transferred to an evaporating dish, from which the solvent is allowed to evaporate overnight. In this manner, 1,2-bis[2-sulfo-9-(2-carbomethoxyethyl)fluoren-9-yl]ethane is obtained as a residue product.

This residue product is dissolved in 500 milliliters of methanol and refluxed for 4 hours to esterify any carboxyl groups present. During reflux, any methyl acetate and/or ethylene dichloride present is removed by distillation and additional methanol is added to maintain a constant volume. The solution is then titrated to a pH of 7.0 with methanolic sodium hydroxide. A precipitate is formed, and upon filtration and recrystallizing the filtered product twice from acetic acid, 75 grams of 1,2-bis[2-sodiumsulfo-9-(2-carbomethoxyethyl)fluoren-9-yl]ethane having a melting point of 391°–394° C., are obtained.

*Analysis.*—For $C_{36}H_{32}O_{10}S_2Na_2 \cdot 3H_2O$—Calculated: C, 54.81%; H, 4.86%. Found: C, 54.71%; H, 4.66%.

In similar manner, 1,6-bis[2-potassiumsulfo-9-(2-carbomethoxyethyl)fluoren-9-yl]hexane is obtained by the substitution of equimolar amounts of 1,6-hexanediol and potassium hydroxide for ethylene glycol and sodium hydroxide, respectively.

*Example II*

A mixture of 155 grams of dimethyl terephthalate, 8.95 grams of 1,2-bis[2-sodiumsulfo-9-(2-carbomethoxyethyl) fluoren-9-yl]ethane, 160 grams of ethylene glycol, 0.056 gram of zinc acetate, and 0.16 gram of antimony oxide are charged to a reactor and heated at a temperature in the range of from 186° C. to 192° C. for 2 hours to bring about an ester exchange, while distilling methanol formed during the reaction. The temperature of the reaction mixture is then slowly raised to 266° C. to remove the glycol excess. Thereafter, the temperature of the reaction mixture is maintained in the range of from 264° C. to 285° C. for 2.25 hours to carry out the polycondensation. During the reaction, a vigorous stream of nitrogen is passed through the melt at atmospheric pressure. A white crystalline polymer is thereby obtained having a reduced viscosity of 0.51 and a melting point of 260–262° C., and is characterized by excellent dyeable, fiber-forming and cold drawing properties. Fibers melt spun from this polyester are dyed to very deep, light- and wash-fast shades with Genacryl Pink G and with Celliton Fast Red GGA Ex. Conc. without the use of a carrier. Similarly, dyeable fibers are also obtained from modified polyethylene terephthalate and terephthalic acid 1,4-cyclohexanedimethanol polyesters, independently employing 1,4-bis[2-lithiumsulfo - 9 - (2 - carbomethoxyethyl)fluoren - 9 - yl]butane, 1,6 - bis[2 - potassiumsulfo - 9 - (2 - carbomethoxyethyl) fluoren-9-yl]hexane, and 1,2-bis[2-sodiumsulfo-9-(2-carbobutoxyethyl)fluoren-9-yl]ethane as the modifier of this invention. By way of comparison, fibers melt-spun conventional unmodified polyethylene terephthalate and terephthalic acid 1,4-cyclohexanedimethanol polyesters are not dyed by Genacryl Pink G and are dyed to a very light shade with Celliton Fast Red GGA Ex. Conc.

*Example III*

A mixture of 103 grams of dimethyl terephthalate, 5.5 grams of 1,2-bis[2-sodiumsulfo-9-(2-carbomethoxyethyl)fluoren-9-yl]ethane, 108 grams of ethylene glycol, 0.042 gram of zinc acetate, and 0.005 gram of antimony oxide are charged to a reactor and heated at a temperature in the range of from 180° C. to 187° C. for 2.25 hours to bring about an ester exchange, while distilling methanol formed during the reaction. The reaction mixture is then heated at a temperature in the range of from 200° C. to 237° C. for 1 hour to remove the glycol excess. Thereafter the temperature of the reaction mixture is maintained in the range of from 265° C. to 269° C. for 3.25 hours to carry out the polycondensation. During the reaction, a vigorous stream of nitrogen is passed through the melt at atmospheric pressure. A white crystalline polymer is thereby obtained having a reduced viscosity of 0.46 and a melting point of about 260° C. Fibers melt-spun from this polyester have the following properties:

Tenacity _____ 4.3 grams per denier.
Stiffness _____ 121 grams per denier at 25° C.
Shrinkage _____ 1 percent in boiling water.

The fibers are dyed to very deep, light- and wash-fast shades with Genacryl Pink G and with Celliton Fast Red GGA Ex. Conc. without the use of a carrier. The fibers, in fabric form, also evidence a pleasantly soft, silk-like hand.

What is claimed is:
1. The dyeable, linear polyester consisting essentially of the condensation product of (a) a dicarboxylic acid compound selected from the group consisting of the monocyclic aromatic dicarboxylic acids and the dialkyl esters thereof; (b) an aliphatic glycol containing from 2 to 10 carbon atoms; and, based upon the total amount of said dicarboxylic acid compound, (c) from about 0.1 to about 10 mole percent of a compound of the formula:

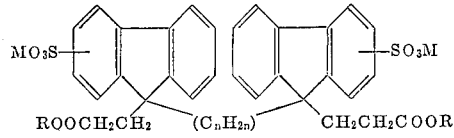

wherein M is an alkali metal, $n$ is an integer of from 2 to 10, and R is selected from the group consisting of hydrogen and alkyl.

2. The dyeable, linear polyester as defined in claim 1 wherein component (a) is dimethyl terephthalate and component (b) is a glycol of the formula:

$$HO(CH_2)_mOH$$

wherein $m$ is an integer of from 2 to 10.

3. The dyeable, linear polyester as defined in claim 1 wherein component (a) is dimethyl terephthalate, component (b) is ethylene glycol and component (c) is 1,2-bis[2 - sodiumsulfo - 9 - (2 - carbomethoxyethyl)fluoren-9-yl]ethane.

4. The dyeable, linear polyester as defined in claim 1 wherein component (a) is dimethyl terephthalate, component (b) is ethylene glycol and component (c) is 1,4-bis[2 - lithiumsulfo - 9 - (2 - carbomethoxyethyl)fluoren-9-yl]butane.

5. The dyeable, linear polyester as defined in claim 1 wherein component (a) is dimethyl terephthalate, component (b) is ethylene glycol and component (c) is 1,2-bis[2 - sodiumsulfo - 9 - (2 - carbobutoxyethyl)fluoren-9-yl]ethane.

6. The dyeable, linear polyester as defined in claim 1 wherein component (a) is dimethyl terephthalate and component (b) is 1,4-cyclohexanedimethanol.

7. The dyeable, linear polyester as defined in claim 1 wherein component (a) is dimethyl terephthalate, component (b) is 1,4-cyclohexanedimethanol and component (c) is 1,2 - bis[2 - sodiumsulfo - 9 - (2 - carbomethoxyethyl)fluorine-9-yl]ethane.

8. The dyeable, linear polyester as defined in claim 1 wherein component (a) is dimethyl terephthalate, component (b) is 1,4-cyclohexanedimethanol and component (c) is 1,4- bis[2 - lithiumsulfo - 9 - (2 - carbomethoxyethyl)fluoren-9-yl]butane.

9. The dyeable, linear polyester as defined in claim 1 wherein component (a) is dimethyl terephthalate, component (b) is 1,4-cyclohexanedimethanol and component (c) is 1,6 - bis[2 - potassiumsulfo - 9 - (2 - carbomethoxyethyl)fluoren-9-yl]hexane.

10. The dyeable, linear polyester as defined in claim 1 in the form of a fiber.

References Cited
UNITED STATES PATENTS

| | | | |
|---|---|---|---|
| 2,970,168 | 1/1961 | Horn et al. | 260—75 |
| 3,018,272 | 1/1962 | Griffing et al. | 260—75 |
| 3,033,824 | 5/1962 | Huffman | 260—75 |
| 3,077,493 | 2/1963 | Horn | 260—470 |
| 3,096,358 | 7/1963 | Horn | 260—429.7 |
| 3,184,434 | 5/1965 | Horn | 260—75 |

WILLIAM H. SHORT, *Primary Examiner.*

L. P. QUAST, *Assistant Examiner.*